(12) United States Patent
Almasan et al.

(10) Patent No.: US 12,242,983 B2
(45) Date of Patent: Mar. 4, 2025

(54) DISTRIBUTED LEDGER BASED MACHINE-LEARNING MODEL MANAGEMENT

(71) Applicant: American Express Travel Related Services Company, Inc., New York, NY (US)

(72) Inventors: Rares Ioan Almasan, Phoenix, AZ (US); Andras L. Ferenczi, Peoria, AZ (US); Mohammad N. Nauman, Peoria, AZ (US); Swatee Singh, Scottsdale, AZ (US); Man Chon U, Sunrise, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 18/342,582

(22) Filed: Jun. 27, 2023

(65) Prior Publication Data

US 2023/0334344 A1 Oct. 19, 2023

Related U.S. Application Data

(62) Division of application No. 16/810,238, filed on Mar. 5, 2020, now Pat. No. 11,868,911.

(51) Int. Cl.
*G06N 5/04* (2023.01)
*G06F 16/22* (2019.01)
(Continued)

(52) U.S. Cl.
CPC ............ *G06N 5/04* (2013.01); *G06F 16/2255* (2019.01); *G06F 16/2365* (2019.01);
(Continued)

(58) Field of Classification Search
CPC ...... G06N 5/04; G06N 20/00; G06F 16/2255; G06F 16/2365; G06F 16/2379; G06F 16/245; G06F 16/27
See application file for complete search history.

(56) References Cited

U.S. PATENT DOCUMENTS

2020/0320349 A1* 10/2020 Yu ........................ G06N 20/00
2020/0357086 A1* 11/2020 Yang .................. G06F 16/2379

OTHER PUBLICATIONS

Dietterich et al., "Machine learning bias, statistical bias, and statistical variance of decision tree algorithms," (1995). (Year: 1995).*

* cited by examiner

*Primary Examiner* — Jay A Morrison
(74) *Attorney, Agent, or Firm* — Thomas Horstemeyer, LLP

(57) ABSTRACT

Disclosed are various approaches for managing the status of machine-learning models using distributed ledgers. A registration request for a machine-learning model can be received. The registration request can include a model name for the machine-learning model, a version identifier for the machine-learning model, a network address from which the machine-learning model can be retrieved, a source code hash for a source code version of the machine learning model, and a runtime hash for a binary executable version of the machine-learning model. A registration identifier can then be created based at least in part on the source code hash and the runtime hash. Subsequently, an entry in the distributed ledger can be created for the machine-learning model. The entry can include the registration identifier, the model name, the model version, the network address, the source code hash, and the runtime hash.

20 Claims, 8 Drawing Sheets

(51) Int. Cl.
*G06F 16/23* (2019.01)
*G06F 16/245* (2019.01)
*G06F 16/27* (2019.01)
*G06N 20/00* (2019.01)

(52) U.S. Cl.
CPC ........ *G06F 16/2379* (2019.01); *G06F 16/245* (2019.01); *G06F 16/27* (2019.01); *G06N 20/00* (2019.01)

DISTRIBUTED LEDGER BASED MACHINE-LEARNING MODEL MANAGEMENT

CROSS-REFERENCE TO RELATED APPLICATIONS

This application is a division of, and claims priority to and the benefit of, copending U.S. patent application Ser. No. 16/810,238, entitled "DISTRIBUTED LEDGER BASED MACHINE-LEARNING MODEL MANAGEMENT" and filed on Mar. 5, 2020, which is incorporated by reference as if set forth herein in its entirety.

BACKGROUND

Machine-learning is a technology that is becoming increasingly ubiquitous. For example, companies are often deploying machine-learning models to address problems in system availability, customer marketing, fraud detection and prevention, credit decisioning, etc. The ability of a machine-learning model to use the results of previous decisions to improve future decisions enables machine-learning models to deliver greater accuracy and predictability in their decisions over time.

Because machine-learning models are often created on an as-needed basis by individual organizations or individual departments within an enterprise, it can be difficult to track when a machine-learning model has been deployed. Moreover, updates to individual machine-learning models over time can mean that different versions of the same model, with different performance characteristics, may be deployed simultaneously. Accordingly, regulators or auditors may be unable to appropriately identify and evaluate deployed machine-learning models when attempting to determine the accuracy, bias, or other performance metrics of a machine-learning model or the risks presented to an enterprise by the use of a particular machine-learning model.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for managing the status of machine-learning models using distributed ledgers. Due to the expanded use and decision-making authority delegated to machine-learning models used in production systems, decisions impacting individuals are increasingly automated. However, as machine-learning models are regularly updated, it can be hard to track which version of a machine-learning model was in use at the time a particular decision or set of decisions was made. As a result, auditors or regulators may have a difficult time tracking the usage and impact of machine-learning models in highly-regulated environments.

Various embodiments of the present disclosure overcome the inability of computer systems to track such data. The machine-learning model can be automatically certified, and the certification can be stored in a distributed ledger (e.g., a blockchain), where multiple stakeholders have nodes. Usage of approved or certified machine-learning models can be controlled through references to the distributed ledger. Likewise, the usage of machine-learning models can be observed and audited by third-parties in a precise manner. In those distributed ledgers that make use of consensus algorithms to control writes and updates in combination with immutable records, auditors or regulators can be assured that the data they are relying upon has not been tampered with. In the following discussion, a general description of the system and its components is provided, followed by a discussion of the operation of the same.

Figure 1:
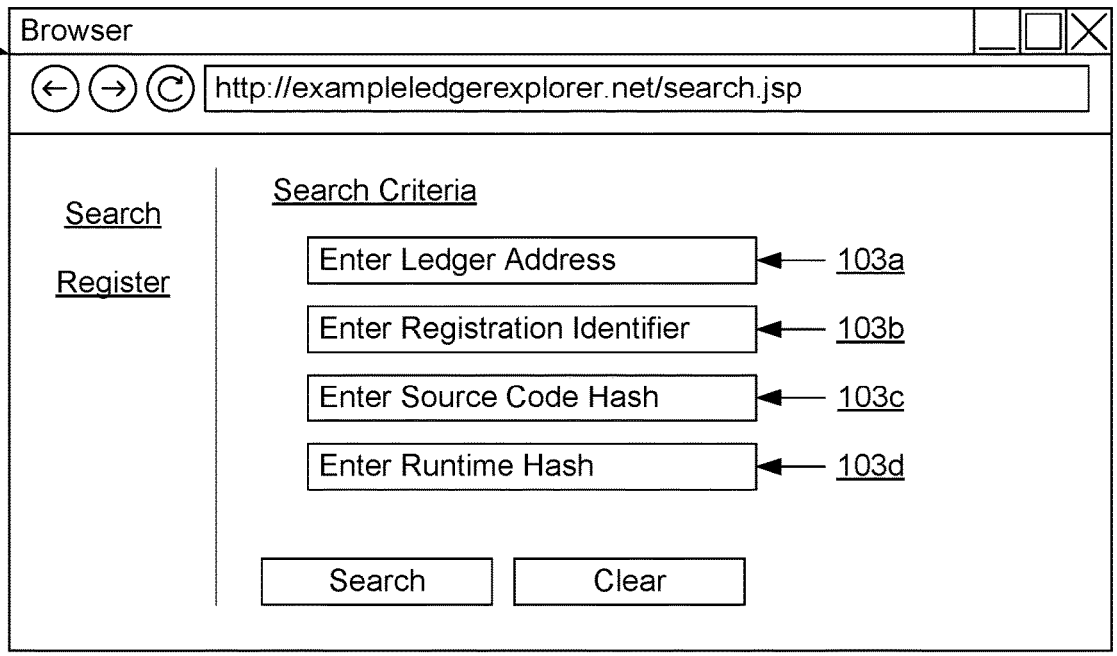
FIGS. 1-5 are drawings depicting example user interfaces rendered by various embodiments of the present disclosure.

FIG. 1 depicts an example of a user interface 100 according to various embodiments of the present disclosure. Although the depicted user interface 100 is in the form of a web page rendered by a browser, other user interfaces may be used, such as interfaces for dedicated or stand-alone applications installed on a user device.

The illustrated user interface 100 can be rendered to provide a user with the ability to search a distributed ledger for an entry for a respective machine-learning model registered with the distributed ledger. Various user interface elements 103 (e.g., user interface element 103a, 103b, 103c, and 103d) may allow for a user to input or provide one or more search criteria. For example, a user may be able to input the ledger address (e.g., a blockchain address) for the entry, the registration identifier associated with the registration of the machine-learning model, or hash value for the source code or runtime version of the machine-learning model. A search button or similar user interface element may also be presented to allow the user to submit a search using the inputted criteria.

Figure 2:
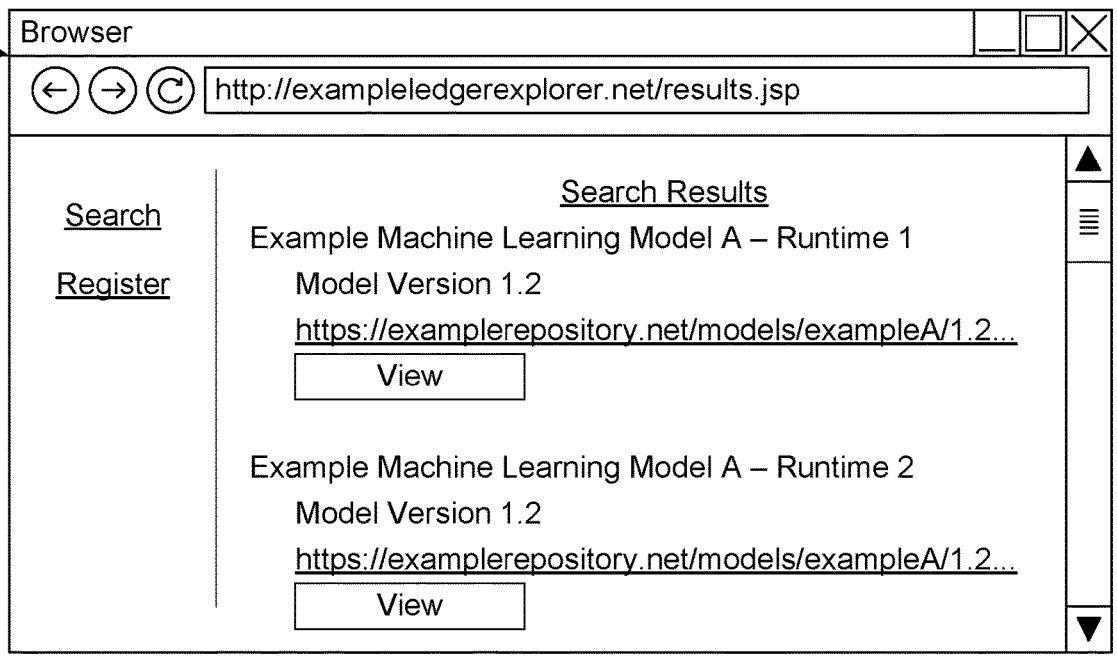

FIG. 2 depicts an example of a user interface 200 according to various embodiments of the present disclosure. Although the depicted user interface 200 is in the form of a web page rendered by a browser, other user interfaces may be used, such as interfaces for dedicated or stand-alone applications installed on a user device.

The illustrated user interface 200 can be rendered to display the results of a search performed using the user interface 100. Depending on the search criteria submitted in user interface 100, one or more search results may be returned. For example, multiple machine learning models may be returned where a hash of the source-code was submitted. This could happen, for example, where a single machine-learning model was deployed multiple times in production, but used different training data sets to create different weights for the different runtime versions that were deployed. Each listed result could include information such as the name and version of the machine-learning model, as well a link to a network location from where the machine-learning model could be retrieved. A view button or similar user interface element may also be presented to allow the user to view individual search results in more detail.

Figure 3:
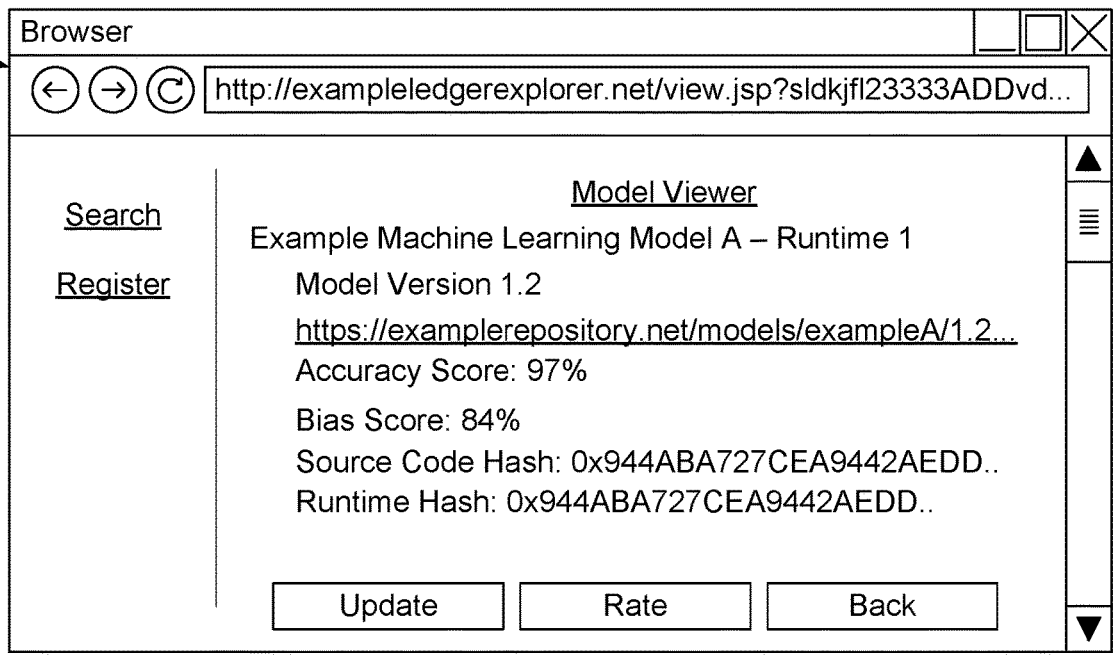

FIG. 3 depicts an example of a user interface 300 according to various embodiments of the present disclosure. Although the depicted user interface 300 is in the form of a web page rendered by a browser, other user interfaces may be used, such as interfaces for dedicated or stand-alone applications installed on a user device.

The illustrated user interface 300 can be rendered to provide a user with additional details about one of the search results provided in the user interface 200. For example, a user might arrive at user interface 300 in response to pressing a view button or interacting with a similar user element in user interface 200. Additional details about the machine-learning model to be displayed could include hashes of the source code for the machine-learning model or the binary executable runtime version of the machine-learning model. Likewise, various performance metrics for the machine-learning model could also be displayed.

The user interface 300 can also provide a user with options to proceed to update the record for the machine-learning model and/or provide feedback regarding the machine-learning model. For instance, an update button or similar user interface element may be provided to allow a user to edit one or more fields related to the machine-learning model. As another example, another button or user interface element may allow a user to provide feedback (e.g., rate or rank the machine-learning model according to one or more performance metrics) regarding the machine-learning model.

Figure 4:
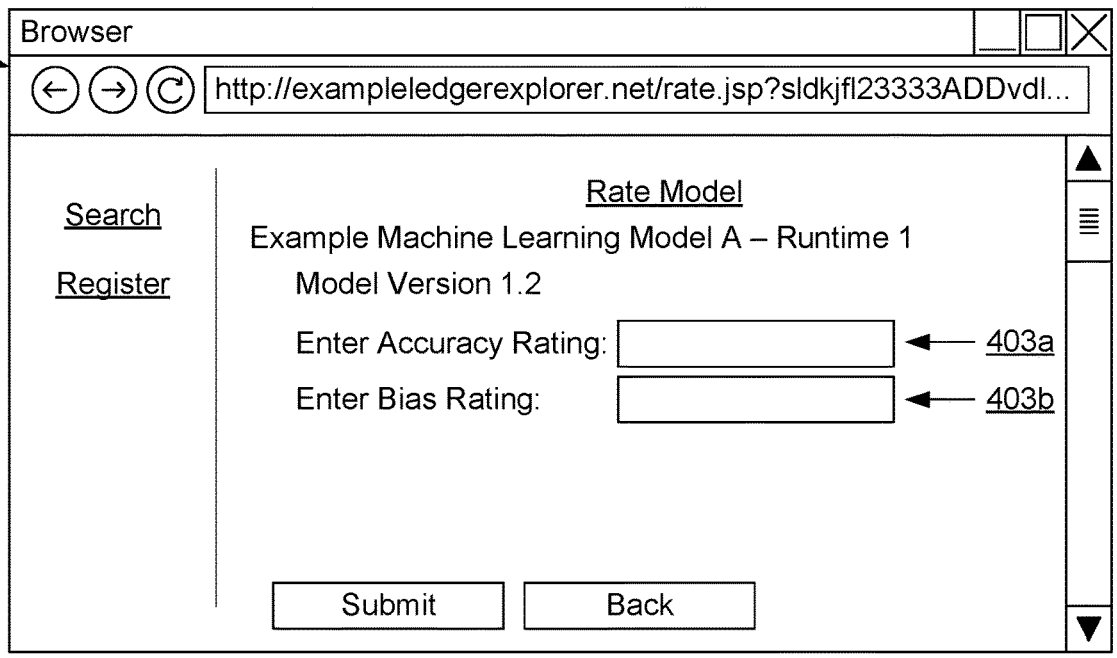

FIG. 4 depicts an example of a user interface 400 according to various embodiments of the present disclosure. Although the depicted user interface 400 is in the form of a web page rendered by a browser, other user interfaces may be used, such as interfaces for dedicated or stand-alone applications installed on a user device.

The illustrated user interface 400 can be rendered to provide a user with the ability to provide feedback on a specific machine-learning model. Accordingly, the user interface 400 could be rendered in response to a user interacting with user interface 300 manipulating a user interface element that offered the user the option to rate, rank, or otherwise provide feedback regarding the machine learning model. One or more user interface elements 403, such as user interface elements 403a and 403b, may be rendered to permit a user to provide feedback. As illustrated, the user may be able to provide a rating of the accuracy of the selected machine-learning model using user interface element 403a or provide a rating of the bias of the selected machine-learning model using user interface element 403b.

Figure 5:
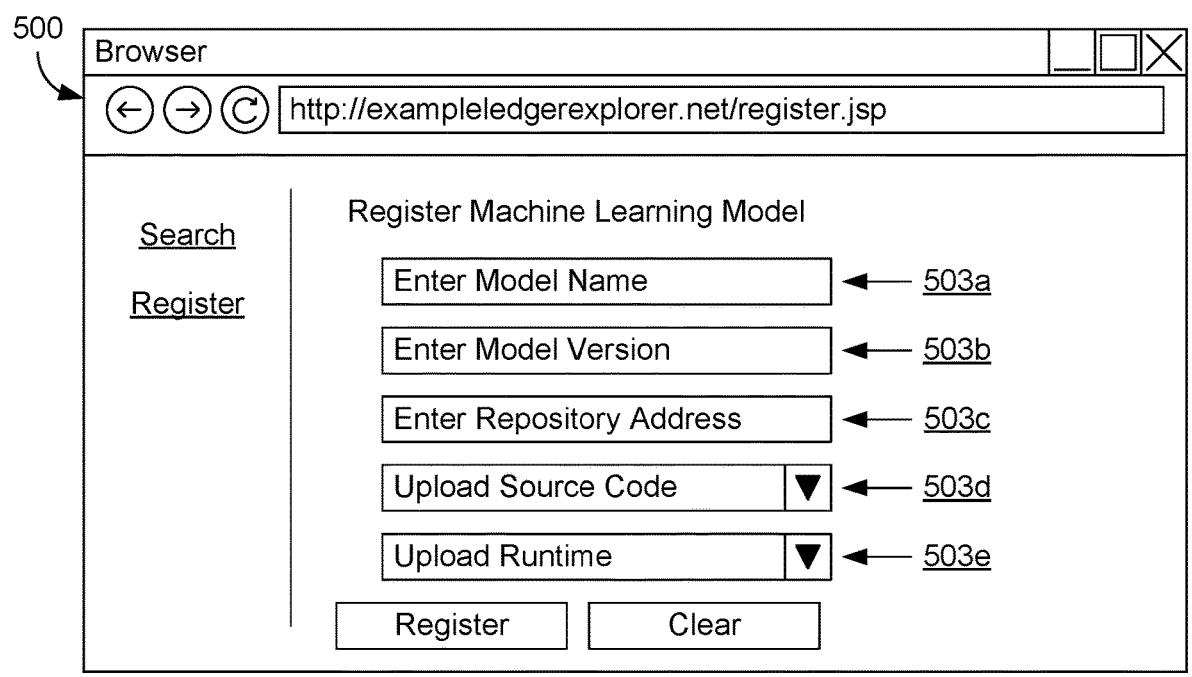

FIG. 5 depicts an example of a user interface 500 according to various embodiments of the present disclosure. Although the depicted user interface 100 is in the form of a web page rendered by a browser, other user interfaces may be used, such as interfaces for dedicated or stand-alone applications installed on a user device.

The illustrated user interface 500 could be rendered to allow a user to submit or register a new or unregistered machine-learning model with the distributed ledger. The user interface 500 could include one or more user interface elements 500 (e.g., user interface element 503a, 503b, 503c, 503d, and 503e) that provide a mechanism for a user to submit information about the machine-learning model to be registered. This information could include the name and/or version of the machine learning model, a link or address to a repository where the machine-learning model can be retrieved or accessed, the source code for the machine-learning model, and/or the compiled runtime or other binary executable version of the machine-learning model.

In some implementations, some of this data could be obtained automatically. For example, in response to submission of a network address for the repository, the name, version, source code and compiled runtime could be retrieved from the repository at the specified network address. In such an example, the user interface element 503c might be presented to the user for input of the repository's address, while other user interface elements 503 might be omitted from the user interface 500.

Figure 6:
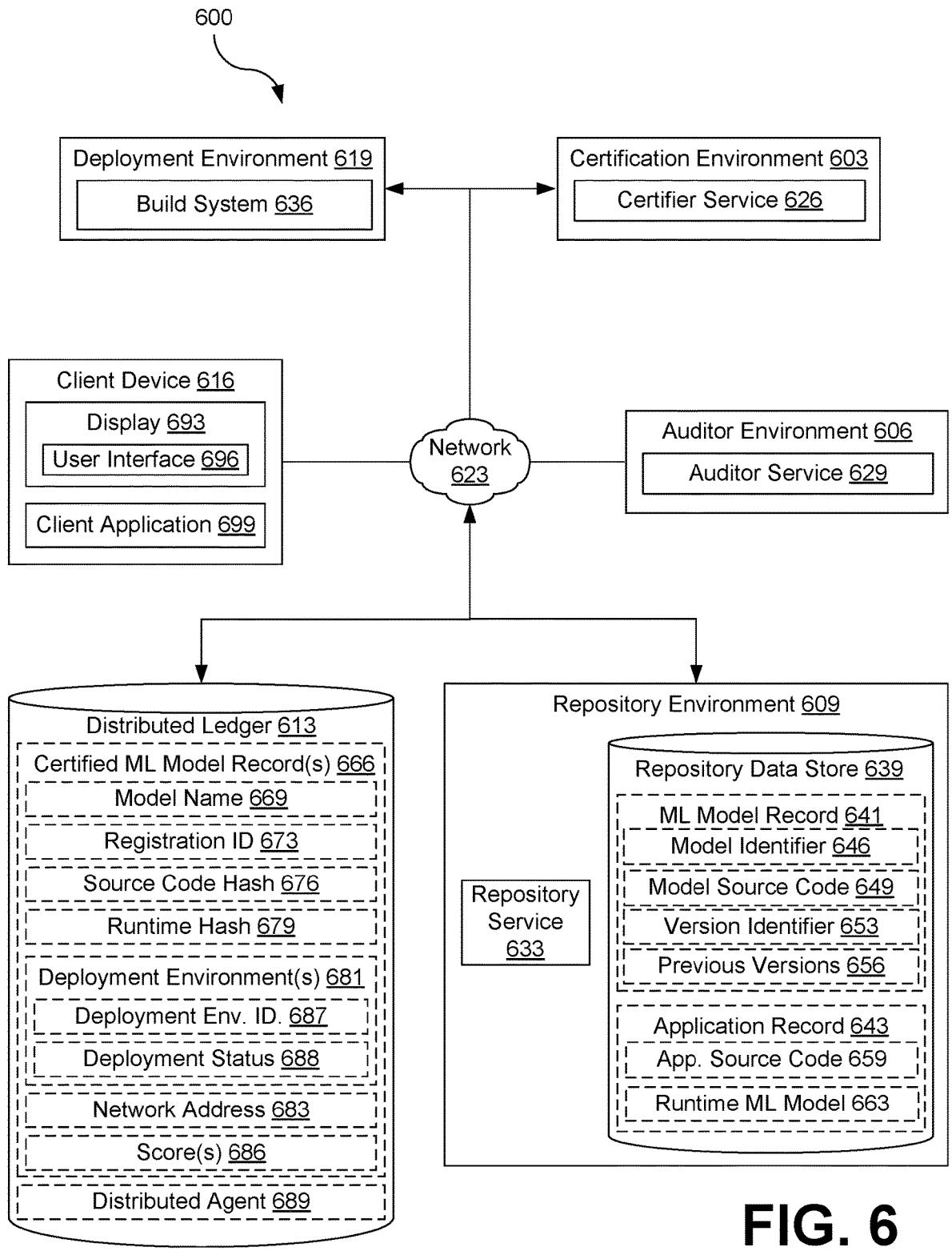
FIG. 6 is a drawing of a network environment according to various embodiments of the present disclosure.

With reference to FIG. 6, shown is a network environment 600 according to various embodiments. The network environment 600 can include a computing a certification environment 603, an auditor environment 606, a repository environment 609, a distributed ledger 613, a client device 616, and a deployment environment 619, which are in data communication with each other via a network 623.

The network 623 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 623 can also include a combination of two or more networks 623. Examples of networks 623 can include the Internet, intranets, extranets, virtual private networks (VPNs), and similar networks.

Computing environments such as the certification environment 603, the auditor environment 606, the repository environment 609, and the deployment environment 619, can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, these computing environments can employ a plurality of computing devices that can be arranged in one or more server banks or computer banks or other arrangements. Such computing devices can be located in a single installation or can be distributed among many different geographical locations. For example, a computing environment can include a plurality of computing devices that together can include a hosted computing resource, a grid computing resource or any other distributed computing arrangement. In some cases, such a computing environment can correspond to an elastic computing resource where the allotted capacity of processing, network, storage, or other computing-related resources can vary over time.

Although the certification environment 603, auditor environment 606, repository environment 609, and the deployment environment 619 are separately depicted in the interests of clarity, the functions of these separate computing environments could be condensed into one or more computing environments. For example, the systems, services, and data stored in the certification environment 603, the auditor environment 606, the repository environment 609, and the deployment environment 619 could be implemented in one or more shared or commonly owned hosting environments.

Accordingly, ownership or control of the separately illustrated computing environments could be divided among multiple parties or shared by a single party or entity. In one example, a single enterprise or organization could own, operate, and control the certification environment 603, the auditor environment 606, the repository environment 609, and the deployment environment 619. As another example, an enterprise could own or control the repository environment 609 and the deployment environment 619 while the certification environment 603 and/or the auditor environment 606 are operated or controlled by independent third-parties (e.g., an accounting or auditing firm, a government regulatory authority, etc.).

Various applications or other functionality can be executed in the various computing environments, such as the certification environment 603, the auditor environment 606, the repository environment 609, and the deployment environment 619. These components can include the certifier service 626, the auditor service 629, the repository service 633, and the build system 636, respectively.

The certifier service 626 can be executed to evaluate a machine-learning model and create a record of it in the distributed ledger 613. In some implementations, the certifier service 626 may automatically evaluate a machine-learning model according to one or more compliance rules and create a record if the machine-learning model complies with each of the compliance rules. Examples of such rules can include a rule specifying that the model meet or exceed a demonstrable performance metric (e.g., a minimum level of accuracy or a maximum permitted amount of bias), the model be submitted by a previously approved individual, entity or organization, etc. In other implementations, the certifier service 626 may send a request to an appropriate individual to manually review a submission of a machine-learning model prior to registration of the model with the distributed ledger 613.

The auditor service 629 can be executed to verify which machine-learning model has been utilized by an application built or compiled and released or otherwise deployed by the build system 636. For example, the auditor service 629 may retrieve, receive, or otherwise obtain information about a machine-learning model used in a production system deployed by the build system 636. The auditor service 629 could then verify that the model in use is one that has been previously certified by the certifier service 626 and/or that the model actually in use is the same as the model that is claimed to be in use.

The repository service 633 can be executed to provide a version control system for hosting source code and/or binary executable runtimes for machine-learning models or other applications, including applications that integrate or make use of machine-learning models. Accordingly, the repository service 633 may allow for tracking of changes between revisions of individual source code files for the machine-learning model, as well as provide network access to the current or previous versions of the source code or respective binary executable runtimes for machine-learning models. Examples of a repository service 633 include the concurrent versioning system (CVS), SUBVERSION®, GIT, MERCURIAL, BITKEEPER, and similar systems.

The build system 636 can be executed to compile and deploy applications from one or more repository services 633. Accordingly, the build system 636 can be configured to retrieve source code from a repository service 633. The build system 636 can then compile the application from the source code and deploy the application to a build target. In some cases, the build system 636 may compile and deploy an application on demand or at periodic and predefined intervals. Examples of a build system 636 include JENKINS® and similar continuous build systems.

Accordingly, various data can be stored in a repository data store 639 that is hosted by the repository environment 609 for use by the repository service 633. The repository data store 639 can be representative of a plurality of data stores, which can include relational databases or non-relational databases such as object-oriented databases, hierarchical databases, hash tables or similar key-value data stores, as well as other data storage applications or data structures. The data stored in the repository data store 639 is associated with the operation of the various applications or functional entities described below. This data can include machine-learning model records 641, application records 643, and potentially other data.

A machine-learning model records 641 can represent date associated with a machine-learning model stored in the repository data store 639 and managed by the repository service 633. Accordingly, a machine learning model record 641 can include a model identifier 646, the model source code 649 for the current version of the machine-learning model and a version identifier 653 for the current version of the machine-learning model. The model identifier 646 may be used, for example, to uniquely identify the machine-learning model represented by the machine-learning model record 641 with respect to other machine-learning models. In addition, previous versions 656 of the machine-learning model may also be stored in a machine-learning model record 641. Each previous version 656 may also have a respective version identifier 653 and/or copy of a respective state of the model source code 649.

An application record 643 can represent an application that makes use of a machine-learning model and is built and deployed by the build system 636. Accordingly, the application record 643 can include a copy of the application source code 659 and a runtime machine-learning model 663. The runtime machine-learning model 663 can be any pre-compiled version of a machine-learning model that has been trained using a training data set to arrive at a specific set of weights for use by the machine-learning model in the application. Accordingly, the runtime machine-learning model 663 could be a dynamically linked library that provides machine-learning functionality and is incorporated into the application during the build process. Because the same machine-learning model could be used in different contexts, different deployments of the same machine-learning model could be trained using different training data sets, which would result in different runtime machine-learning models 663 being created from the same version of the model source code 649. This is because each set of training data could result in a respective runtime machine-learning model 663 observing different patterns and developing different weights for inputs and outputs within the same model.

The distributed ledger 613 can represent a synchronized, eventually consistent, data store spread across multiple nodes in different geographic or network locations. Each member of the distributed ledger 613 can contain a replicated copy of the distributed ledger 613, including all data stored in the distributed ledger 613. Records of transactions involving the distributed ledger 613 can be shared or replicated using a peer-to-peer network connecting the individual members that form the distributed ledger 613. Once a transaction or record is recorded in the distributed ledger 613 by one of the members of the distributed ledger 613, it can be replicated across the peer-to-peer network until the record is eventually recorded with all members. Various consensus methods can be used to ensure that data is written reliably to the distributed ledger 613. Examples of a distributed ledger can include blockchains, distributed hash tables (DHTs), and similar data structures.

Various data can also be stored in a distributed ledger 613, such as one or more certified machine-learning model records 666. Each certified machine-learning model record 666 can include information about a machine-learning model that has been certified by the certifier service 626 for use in one or more applications. Accordingly, a certified machine-learning model record 666 could include information such as the model name 669, registration identifier 673, source code hash 676, runtime hash 679, a deployment environment 681, network address 683, and one or more scores 686 associated with a particular machine-learning model.

The model name 669 is any descriptive name that can be assigned to a machine-learning model by a user. Accordingly, the model name 669 could include any alphanumeric string of characters.

The registration identifier 673 is a unique identifier used to uniquely identify a machine-learning model with respect to another machine-learning model or another version of the same machine-learning model. In some implementations, the registration identifier 673 can be derived from the source code hash 676 and the runtime hash 679. For example, the registration identifier 673 could be formed by concatenating the source code hash 676 and the runtime hash 679. As another example, the registration identifier 673 can be created by supplying the source code hash 676 and the runtime hash 679 as arguments to a hash function.

The source code hash 676 is a hash value that uniquely identifies a particular version or state of the model source code 649 of the machine-learning model registered with the distributed ledger 613. The source code hash 676 can be derived using various approaches. For example, one approach would be to create a single archive file of the model source code 649 and provide the archive file as an input to a hash function.

The runtime hash 679 is a hash value that represents a particular version of a runtime machine-learning model 663 compiled from the model source code 649 for a respective version of the machine-learning model. The runtime hash 679 can be created by supplying the runtime machine-learning model 663 as an argument to a cryptographic hash function or through the use of other hash generating functions or approaches.

The deployment environment 680 can represent the application or execution environment in which the runtime machine-learning model 663 is used. For example, if a runtime machine-learning model 663 is incorporated into a particular application compiled and/or deployed by the build system 636, the deployment environment 680 could include information such as the deployment environment identifier 687 and the deployment status of the runtime machine-learning model 663. The deployment environment identifier 687 represents a unique application or environment identifier, such as an application name, fully-qualified domain name (FQDN), or other service or environment identifier. For example, where the same application is deployed multiple times, each deployment instance could be recorded using a separate deployment environment identifier 687. Accordingly, the deployment environment identifier 687 could include a link or reference to an application record 643 to indicate the application deployed concatenated with some other identifier to indicate where or in what context the application was deployed. The deployment status 688 can represent whether the runtime machine-learning model 663 is currently or has previously been deploy for use in a particular application. If a runtime machine-learning model 663 has been incorporated into multiple applications, then multiple deployment environments 681 may be listed in the certified machine-learning model record 666.

The network address 683 can represent a uniform resource locator (URL) or uniform resource identifier (URI), internet protocol (IP) address, or similar address that identifies the repository service 633 from which the runtime machine-learning model 663 can be retrieved. The network address 683 can also include a relative path to the location of the runtime machine-learning model 663. However, in some instances, the network address 683 could identify a non-network location of the runtime machine-learning model 663 (e.g., a file path or a URI beginning with the "file://" prefix). If the repository service 633 has not made the runtime machine-learning model 663 publicly available, the network address 683 could also include the necessary credentials (e.g., username and password, cryptographic certificate or key, etc.) for accessing the machine-learning model 663.

The scores can represent various performance metrics that can be used to evaluate or rank the runtime machine-learning model 663. Examples of performance metrics that could be represented by a respective score include the accuracy of the runtime machine-learning model 663 and/or a measure of any bias by the runtime machine-learning model 663.

The distributed agent 689 can represent a script or other executable which can be stored in the distributed ledger 613 and executed by individual hosts or peers of the distributed ledger 613. When a computation is performed by the distributed agent 689, each host or peer that forms the distributed ledger 613 can perform the computation and compare its result with the results computed by other hosts or peers. When a sufficient number of hosts or peers forming the distributed ledger 613 agree on the result of the computation, the result can be stored in the distributed ledger 613 or provided to the computing device that invoked the distributed agent 689. An example of a distributed agent 689 is a "smart contract" used in the ETHEREUM platform, although other distributed ledger or blockchain-based technologies provide similar functionality.

For instance, a distributed agent 689 could be programmed to manage the data stored within the distributed ledger 613. The distributed agent 689 could create new certified machine-learning model records 666 when a function provided by the distributed agent 689 is invoked with the appropriate arguments. As another example, the distributed agent 689 could search the distributed ledger 613 for applicate certified machine-learning model records 666 in response to search queries for specific records. Moreover, the distributed agent 689 could also update certified machine-learning model records 666 in response to feedback provided about the machine-learning model, such as updating scores 686 to reflect additional feedback about the performance of the deployed model.

The client device 616 is representative of a plurality of client devices that can be coupled to the network 623. The client device 616 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 616 can include one or more displays 693, such as liquid crystal displays (LCDs), gas plasma-based flat panel displays, organic light emitting diode (OLED) displays, electrophoretic ink ("E-ink") displays, projectors, or other types of display devices. In some instances, the display 693 can be a component of the client device 616 or can be connected to the client device 616 through a wired or wireless connection.

The client device 616 can be configured to execute various applications such as a client application 699 or other applications. The client application 699 can be executed in a client device 616 to access or interact with the distributed ledger 613, the certifier service 626, the auditor service 629, the repository service 633, the build system 636, and/or the distributed agent 689, thereby rendering a user interface 696 (such as user interfaces 100, 200, 300, 400, 500, and/or others) on the display 693. To this end, the client application 699 can include a browser, a dedicated application, or other executable, and the user interface 696 can include a network page, an application screen, or other user mechanism for obtaining user input. The client device 616 can be configured to execute applications beyond the client application 699 such as email applications, social networking applications, word processors, spreadsheets, or other applications.

Next, a general description of the operation of the various components of the network environment 200 is provided. The following general description illustrates many of the principles of the various embodiments of the present disclosure. However, more detailed descriptions of the operations of individual components is provided in the description accompanying the subsequent flowcharts.

To begin, a developer or other user can create and save a machine-learning model to the repository data store 639 maintained by the repository service 633. In response, the repository service 633 creates a machine-learning model record 641 in the repository data store 639. The repository service 633 can save the model source code 649 provided by the user and mark the initial commit of the model source code 649 as the first version. The repository service 633 can then make the model source code 649 available to the user and/or potentially other users.

Subsequently, the model source code 649 may be compiled to generate a runtime machine-learning model 663. The compiled runtime machine-learning model 663 may then be integrated into a library, module, or other component of a larger application. However, after the runtime machine-learning model 663 is created, or as part of the compilation process, the runtime machine-learning model 663 may also be trained using training data to adjust the weights or factors used by the runtime machine-learning model 663 for its specific use case. Accordingly, multiple, different runtime machine-learning models 663 can be created from the same version of the model source code 649.

The runtime machine-learning model 663 and the respective model source code 649 can then be sent to or obtained by the certifier service 626 for validation. In some instances, the certifier service 626 could notify an administrative user to review the runtime machine-learning model 663 and the respective model source code 649 and certify them. In other instances, the certifier service 626 could evaluate the runtime machine-learning model 663 and the respective model source code 649 for compliance with one or more predefined compliance policies or rules. One example of a compliance policy could be that the runtime machine-learning model 663 be trained using a certified or approved dataset. Another example of a compliance policy could be that the runtime machine-learning model 663 satisfy a minimum performance metric (e.g., have a minimum level of accuracy or maximum amount of bias). Other compliance policies may also be used as appropriate.

The certifier service 626 could also verify that the runtime machine-learning model 663 was created from the model source code 649. For example, the certifier service 626 could compile the model source code 649 and compare its compiled version with the runtime machine-learning model 663. If the two versions match, then the certifier service 626 could determine that the runtime machine-learning model 663 was a valid version. In some implementations, the certifier service 626 could train its compiled version of the runtime machine-learning model 663 using the same training data that was used for the first version of the runtime machine-learning model 663. If both trained versions match, then the certifier service 626 could determine that the runtime machine-learning model 663 was a valid version Once the certifier service 626 completes evaluation of the runtime machine-learning model 663, it can register the runtime machine-learning model 663 with the distributed ledger 613. For example, the certifier service 626 could invoke a function provided by the distributed agent 689 and supply as arguments the model name 669, the network address 683, and various other data. In some implementations, the certifier service 626 could compute a source code hash 676 and a runtime hash 679 and supply them to the distributed agent 689. In other implementations, the certifier service could provide copies of the model source code 649 and the runtime machine-learning model 663 to the distributed agent 689, which could create the source code hash 676 and runtime hash 679 itself. Once the distributed agent 689 has received the appropriate information, it can create a certified machine-learning model record 666 in the distributed ledger 613. The presence of the certified machine-learning model record 666 in the distributed ledger 613 can act as a permanent and immutable record that the machine learning model had been previously certified by the certifier service 626.

Subsequently, the build system 636 can compile and/or deploy an application. For example, the build system 636 can compile the application source code 659 stored in an application record 643 maintained by the repository service 633. As part of the compilation process, the runtime machine-learning model 663 can be linked to or integrated into the application. Accordingly, the build system 636 could query the distributed agent 689 to determine that the runtime machine-learning model 663 has been previously certified, which could be indicated by the presence of a certified machine-learning model record 666 being stored in the distributed ledger 613. If the runtime machine-learning model 663 is certified, then the build system 636 can include the runtime machine-learning model 663 in the compiled application. The build system 636 could also update the certified machine-learning model record 666 to reflect the deployment status 688 of the runtime machine-learning model 663, such as creating or editing the deployment environment 681 within the certified machine-learning model record 666.

Later, the auditor service 629 can be executed to verify that the runtime machine-learning model 663 included in a deployed application is authorized. For example, the auditor service 629 could retrieve a copy of the runtime machine-learning model 663 from one of several sources, such as the application record 643 for a deployed application or from a production instance of the application. The auditor service 629 could then compute or calculate a runtime hash for the runtime machine-learning model 663 and search the distributed ledger 666 for a certified machine-learning model record 666 with a matching runtime hash 679. If a certified machine-learning model record 666 is found, this could be used as a conclusion that the runtime machine-learning model 663 is certified. However, a further check could be made to see if the deployment status 688 indicates that the runtime machine-learning model 663 is supposed to be used in the deployed application. If the deployment status 688 fails to indicate that the runtime machine-learning model 663 is currently deployed in the application, then the auditor service 629 could determine that the incorrect runtime machine-learning model 663 is in use. Appropriate remediation efforts could then be pursued.

Figure 7:
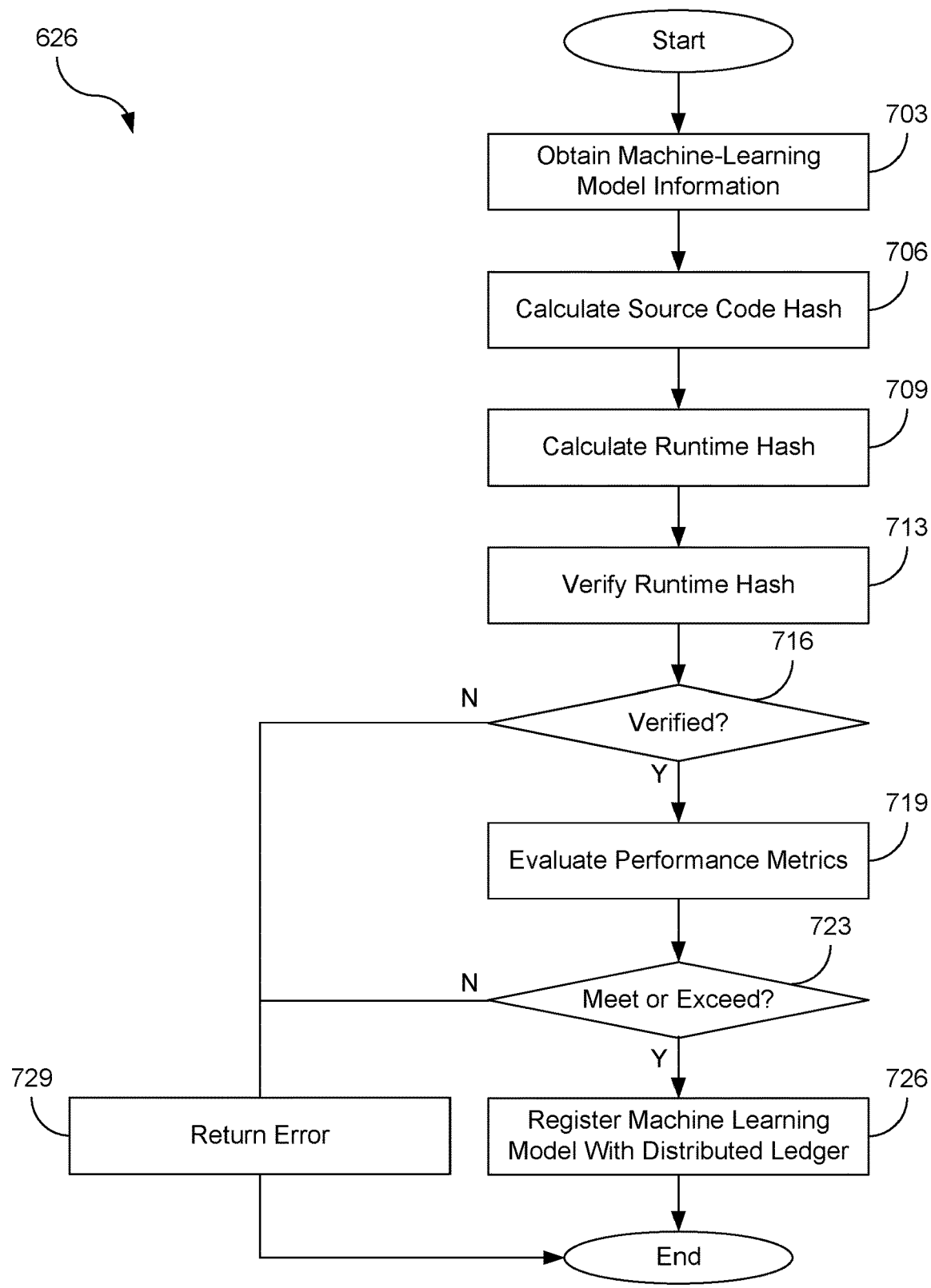
FIGS. 7-10 are flowcharts illustrating examples of functionality implemented in the network environment of FIG. 6 according to various embodiments of the present disclosure.

Referring next to FIG. 7, shown is a flowchart that provides one example of the operation of a portion of the certifier service 626. The flowchart of FIG. 7 provides merely an example of the many different types of functional arrangements that can be employed to implement the operation of the depicted portion of the certifier service 626. As an alternative, the flowchart of FIG. 7 can be viewed as depicting an example of elements of a method implemented within the network environment 600.

Beginning with box 703, the certifier service 626 can obtain information about the machine-learning model to be evaluated. This can include a model identifier 646, the model source code 649, the runtime machine-learning model 663, and a network address 683 associated with the runtime machine-learning model 663. In some implementations, the certifier service 626 can receive this information from an application that is requesting certification of a machine-learning model, such as a request from the client application 699, the auditor service 629, the build system 636, etc.

However, in other implementations, the certifier service 626 could be configured to retrieve this information automatically. For example, the certifier service 626 could receive a model identifier 646 and a copy of the runtime machine-learning model 663 from the build system 636 in response to compilation or deployment of an application. The certifier service 626 could then automatically retrieve the model source code 649 from the repository data store 639. Similarly, the certifier service 626 could receive a network address 683 and a model identifier 646 and retrieve a copy of the model source code 649 and the runtime machine-learning model 663 from the repository data store 639.

Then at box 706, the certifier service 626 can calculate the source code hash 676 for the model source code 649. This could be done, for example, by taking an archived version of the model source code 649 (e.g., a compress ZIP file, TAR file, or similar archive), and providing it as an input to a cryptographic hash function. As another example, a sequence of source code files could be provided as arguments to a cryptographic hash function. Various other approaches could also be used.

Next at box 709, the certifier service 626 can calculate the runtime hash 676 for the runtime machine-learning model 663. This could be done, for example, by providing the runtime machine-learning model 663 as an input to a cryptographic hash function.

Moving on to box 713, the certifier service 626 may further verify the runtime hash 676. For example, the certifier service 626 could compile a second version of the runtime machine learning model 663 from the model source code 649. The certifier service 626 could then compute a second runtime hash 679 for the newly compiled runtime machine learning model 663. If the runtime hash 679 calculated at box 709 matches the second runtime hash 679, the certifier service 626 can conclude that the runtime machine-learning model 663 obtained at step 703 is the correct runtime machine-learning model 663. In some implementations, however, the certifier service 626 may further train the second version of the runtime machine-learning model 663 using the same training data as was used for the runtime machine-learning model 663 obtained at box 703. This may be done to make sure that the weights stored in the second version of the runtime machine-learning model 663 match the first version of the runtime machine-learning model 663, so that the runtime hashes 679 for the two runtime machine-learning models 663 match.

Referring next to box 716, the certifier service 626 can determine whether the runtime hash 676, and therefore the runtime machine-learning model 663 obtained at box 703, was verified. This could be based on a determination that the runtime hash 676 of the runtime machine-learning model 663 matched the second runtime hash 676 of the second runtime machine-learning model 663. If the runtime hash 676 is verified, then the process proceeds to box 719. If verification fails, then the process skips to box 729.

If the process proceeds to box 719, the certifier service 626 can also evaluate the runtime machine-learning model 663 according to one or more performance metrics. For example, the certifier service 626 could determine whether the runtime machine-learning model 663 satisfies a compliance policy specifying a minimum level of accuracy or a maximum level of bias. The evaluation could be performed, for example, by evaluating the results of the runtime machine-learning model 663 when it is used against a control data set, where the results are already known. For example, the runtime machine-learning model 663 could be used to classify a control set of images, where the classification of individual images is already known, in order to evaluate the accuracy of the runtime machine-learning model 663. Similarly, feeding the runtime machine-learning model 663 a control data set and evaluating the results could be used to evaluate the bias or variance of the runtime machine-learning model 663. The determined accuracy, bias, or variance could then be evaluated to determine whether the metric satisfies a compliance policy.

Next at box 723, the certifier service 626 can determine if the evaluated performance criterion satisfies a performance metric specified by a compliance policy. For example, the certifier service 626 could determine whether the accuracy of the runtime machine-learning model 663 meets or exceeds a minimum threshold specified by a compliance policy. As another example, the certifier service 626 could determine whether the bias or variance exhibited by the runtime machine-learning model 663 is less than a maximum value specified in a compliance policy. If the performance metrics are compliant, then the process proceeds to box 726. Otherwise, the process skips to box 729.

If the process proceeds to box 726, the certifier service 626 can register the runtime machine-learning model 663 with the distributed ledger 613. For example, the certifier service 626 could invoke a function provided by a distributed agent 689 that will create a certified machine-learning model record 666 in the distributed ledger 613. The function could accept as inputs information such as the source code hash 676, the runtime hash 679, and the network address 683. In some implementations, one or more scores 686 could also be provided as inputs, such as scores 686 resulting from the evaluation of the runtime machine-learning model 663 at box 719. Once the distributed agent 689 is invoked to register the runtime machine-learning model 663, the process can end.

However, if the process proceeds to box 729, the certifier service 626 may return an error or error message to the process, service, or user that requested certification. The error message can include information such as the nature or cause of the error. After returning the error message, the process can end.

Figure 8:
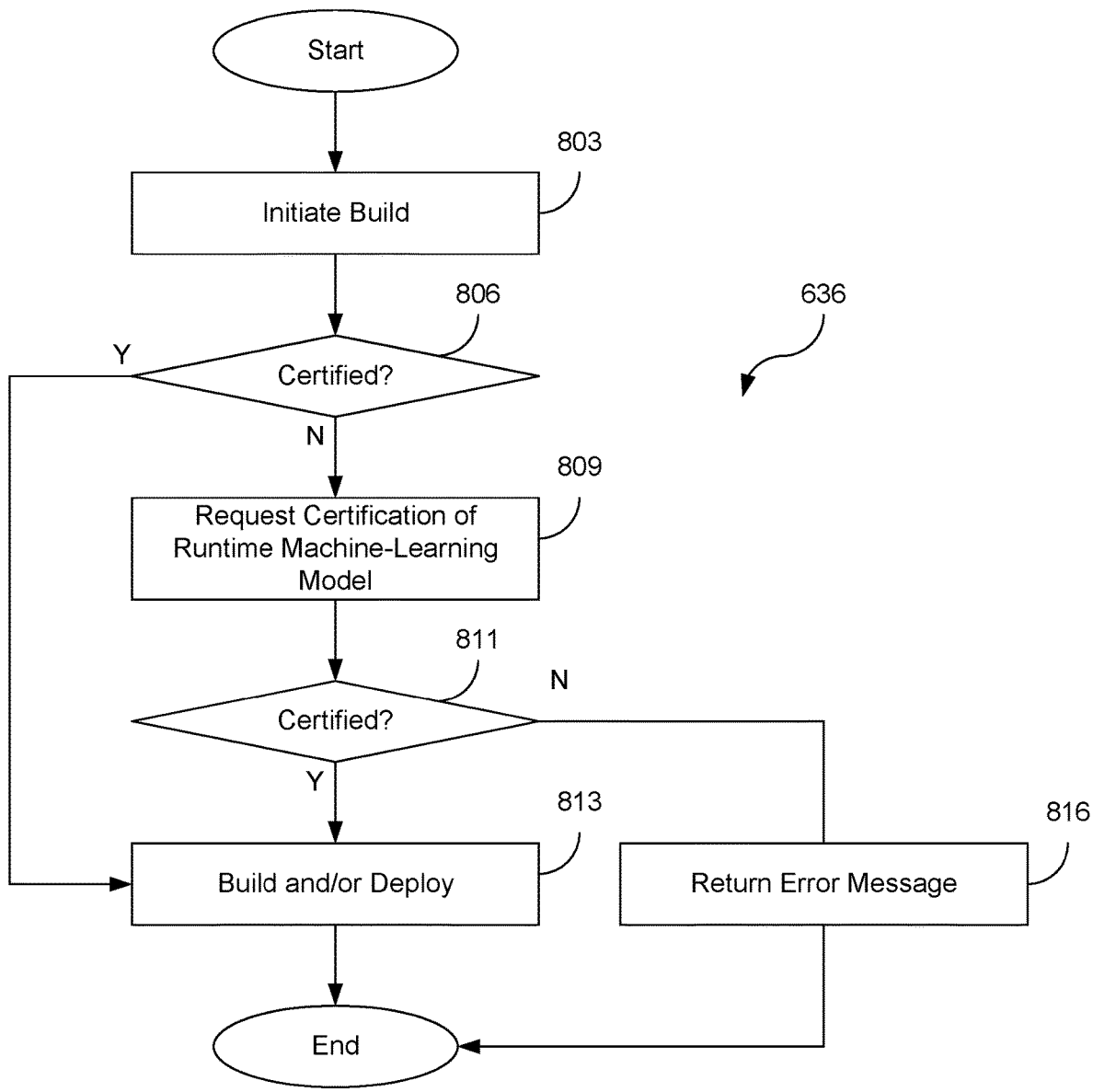

Referring next to FIG. 8, shown is a flowchart that provides one example of the operation of a portion of the build system 636. The flowchart of FIG. 8 provides merely an example of the many different types of functional arrangements that can be employed to implement the operation of the depicted portion of the build system 636. As an alternative, the flowchart of FIG. 8 can be viewed as depicting an example of elements of a method implemented within the network environment 600.

Beginning with box 803, the build system 636 can initiate a build of an application that uses a runtime machine-learning model 663. For example, the build system 636 may identify or obtain the relevant files and configuration variables need to compile, create, and/or deploy an application. This can include identifying the application source code 659 to be compiled and the runtime machine-learning model 663 to be integrated into the application. The build may be initiated in response to various factors. For example, the build system 636 may be configured to initiate a build whenever a change is committed to the application source code 659 or at periodic intervals. The build system 636 can also initiate the build in response to an explicit request received from a client device 616 or other computing system.

Moving on to box 806, the build system 636 can determine whether the runtime machine-learning model 663 has been certified. For example, the build system 636 could calculate the runtime hash 679 of the runtime machine-learning model 663. The build system 636 could then submit the runtime hash 679 as search parameter to the distributed agent 689. If the distributed agent 689 returns a certified machine-learning model record 666 for the runtime machine-learning model 663, then the build system 636 can determine that the runtime machine-learning model 663 has been certified. In this instance, the process would skip to box 813. However, if the distributed agent 689 fails to return a certified machine-learning model record 666, then the build system 636 can determine that the runtime machine-learning model 663 has not been certified. In this case, the process would proceed to box 809.

If the process proceeds to box 809, the build system 636 can request certification of the runtime machine-learning model 663. For example, the build system 636 could send one or more of the runtime machine-learning model 663, application source code 659, and/or network address 683 to the certification service 626 for certification as previously described (see e.g., FIG. 7). The certification service 626 could then provide a response regarding the success or failure of the certification request for the runtime machine-learning model 663.

Assuming the process proceeds to box 811, then the build system 636 can confirm whether the certification service 626 certified the runtime machine-learning model 663. For example, the build system 636 could receive a response from the certification service 626 that the runtime machine-learning model 663 has been certified or that there was an error. If certification was successful, then the process can proceed to box 813. Otherwise, the process can proceed to box 816.

If the process proceeds to box 813, then the build system 636 can then proceed with building and/or deploying the application. For example, the build system 636 could compile the application source code 659 and link the runtime machine-learning model 663 to the compiled application source code 659. The resulting binary could then be published, sent, or uploaded to a computing device for subsequent execution. The process then ends.

However, if the process proceeds to box 813, then the build system 636 can return an error message to the service, computing device, or user that initiated the build. The error message can include an indication that the build failed and the reason that the build failed (e.g., use of an uncertified runtime machine-learning model 663, a compiler error, etc.). The process then ends.

Figure 9:
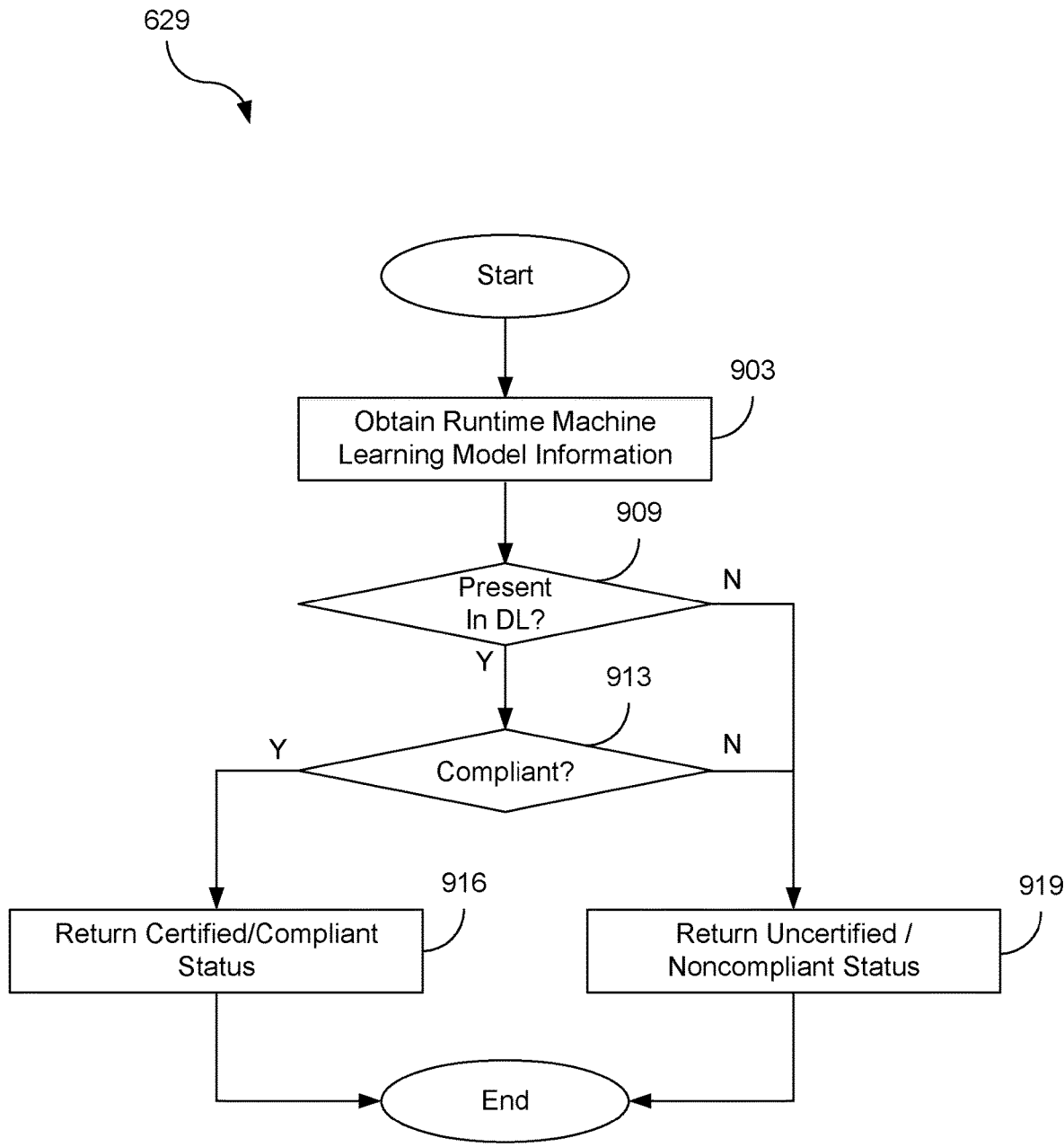

Referring next to FIG. 9, shown is a flowchart that provides one example of the operation of a portion of the auditor service 629. The flowchart of FIG. 9 provides merely an example of the many different types of functional arrangements that can be employed to implement the operation of the depicted portion of the auditor service 629. As an alternative, the flowchart of FIG. 9 can be viewed as depicting an example of elements of a method implemented within the network environment 600.

Beginning with box 903, the auditor service 629 can obtain information about a runtime machine-learning model 663 in response to an audit request. The audit request may be generated automatically and/or periodically (e.g., as the result of a script or timer) or be received as a request from another device or service. The request may include various information about the runtime machine-learning model 663 to be audited. For example, the request could include identifying information such as a registration identifier 673, a source code hash 676, and/or a runtime hash 679. Additional information about the runtime machine-learning model 663 could also be included in the request, such as information about the deployment environment 681, (e.g., the deployment environment identifier 687), the model name 669, the version identifier 653 for the respective model source code 649, etc. However, the auditor service 629 can also query the repository service 633 to obtain any information from the repository data store 639 that was not included in the request.

Next at box 909, the auditor service 629 can determine whether a certified machine-learning model record 666 for the runtime machine-learning model 663 is present in the distributed ledger 613. For example, the auditor service 629 could provide the runtime hash 679 to a distributed agent 689 as a search criterion and receive a certified machine-learning model record 666 in response. Other information can be used as search criteria, according to various embodiments of the present disclosure. If a certified machine-learning model 666 is present in the distributed ledger 613, then the process can proceed to box 913. Otherwise, the auditor service 629 can determine that the runtime machine-learning model 663 has not been certified, in which case the process skips to box 919.

Moving on to box 913, the auditor service 629 can determine whether the runtime machine-learning model 663 satisfies one or more compliance policies. For example, the auditor service 629 could evaluate whether the deployment environment 681 specified in the certified machine-learning model record 666 matches how the runtime machine-learning model 663 being audited is actually deployed. As another example, the auditor service 629 could determine whether the scores 686 for various performance metrics recorded in the certified machine-learning model record 666 meet minimum or maximum thresholds for various performance metrics (e.g., accuracy, bias, variance, etc.). If the auditor service 629 determines that the runtime machine-learning model 663 is compliant, then the process proceeds to box 916. Otherwise, the process proceeds to box 919.

Then at box 916, the auditor service 629 can return a message indicating that the runtime machine-learning model 663 is certified and/or satisfies one or more compliance policies. After the message is returned, the process can end.

However, if the process proceeds to box 919, the auditor service 629 can return an error message that the runtime machine-learning model 663 is uncertified and/or fails to satisfy one or more compliance policies. The message can also contain information about the specific error condition. After the message is returned, the process can end.

Figure 10:
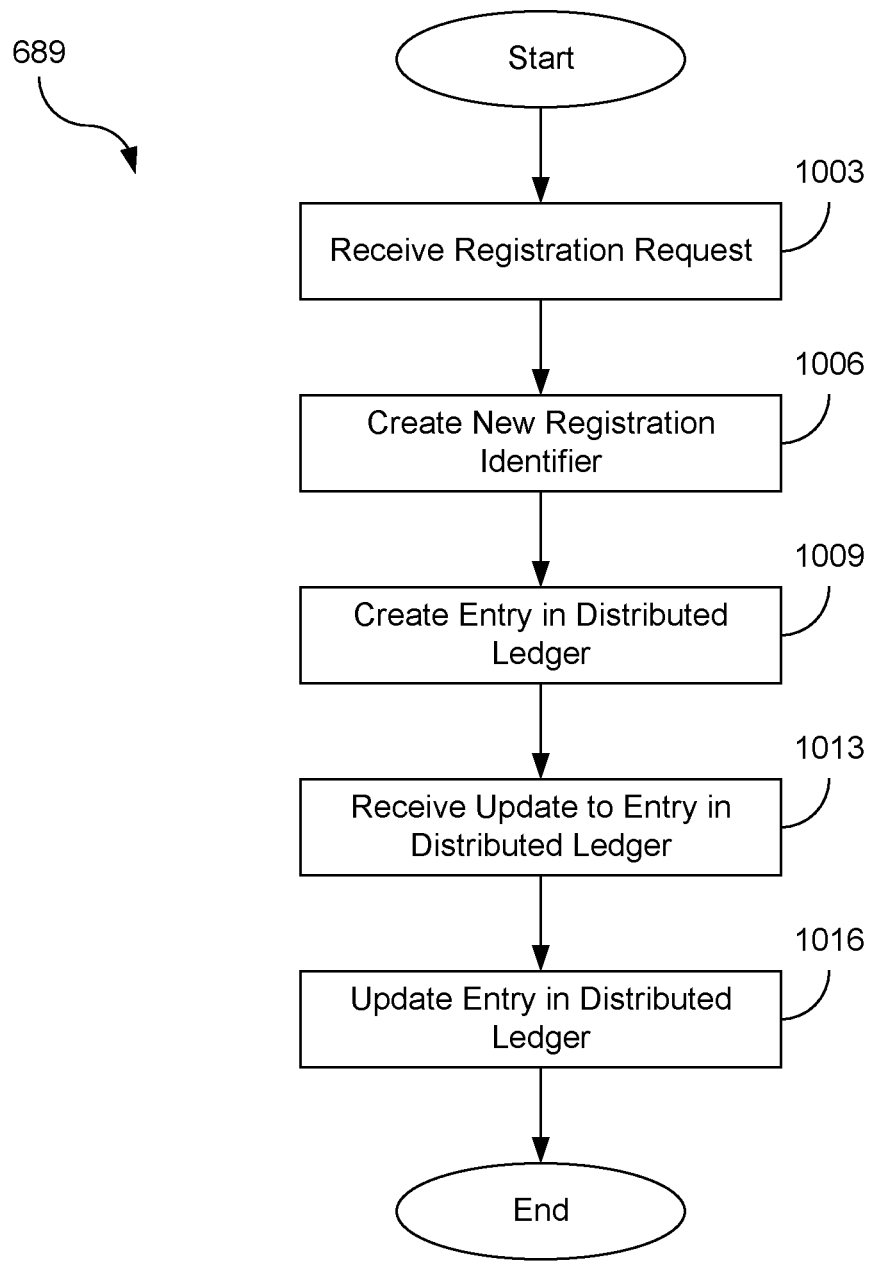

Referring next to FIG. 10, shown is a flowchart that provides one example of the operation of a portion of the distributed agent 689. The flowchart of FIG. 10 provides merely an example of the many different types of functional arrangements that can be employed to implement the operation of the depicted portion of the distributed agent 689. As an alternative, the flowchart of FIG. 10 can be viewed as depicting an example of elements of a method implemented within the network environment 600.

Beginning with box 1003, the distributed agent 689 can receive a registration request for a machine-learning model. The registration request can include one or more of a model name 669, a source code hash 676, a runtime hash 679, a deployment environment identifier 687, a deployment status 688, a network address 683, and one or more scores 686. In some implementations, the distributed agent 689 can provided multiple functions to be invoked to register a machine-learning model, each function allowing for a different combination of arguments to be submitted. Information that is not received by the distributed agent 689 may be able to be obtained independently by the distributed agent. For example, the distributed agent 686 could use the network address 683 to request from the repository service 633 copies of the model source code 649 and runtime machine-learning model 663. The distributed agent 686 could then calculate the source code hash 676 and the runtime hash 679 without needing for it to be provided to the distributed agent 686.

Then at box 1006, the distributed agent 689 can create the registration identifier 673. For example, the distributed agent 689 could concatenate the source code hash 676 and the runtime hash 679 to form the registration identifier 673. The registration identifier 673 can be used as a unique identifier for searching the distributed ledger 613 at a later point in time, as previously discussed.

Next at box 1009, the distributed agent 689 can create a certified machine-learning model record 666 in the distributed ledger 613. The certified machine-learning model record 666 can then be populated with the information provided or calculated at boxes 1003 and 1006.

Subsequently at box 1013, the distributed agent 689 can subsequently receive a request to update the certified machine-learning model record 666. The request may include one or more search criteria to identify the certified machine-learning model record 666 and one or more values to use for updating the certified machine-learning model record 666. For example, the request could include the registration identifier 673 for the specific certified machine-learning model record 666.

Then at box 1016, the distributed agent 689 can then update the certified machine-learning model record 666 to reflect the values contained in the update request. For example if a new rating for the score 686 were specified, the distributed agent 689 could replace the current score 686 with rating. As another example, the distributed agent 689 could average the rating with the existing score 686 to create a new score 686, or simply add the rating to a list of scores 686 already stored in the certified machine-learning model record 666. As another example, if the runtime machine-learning model 663 had been installed or linked to an additional application or deployed in a new environment, the deployment environment 681 could be updated to include an additional deployment environment identifier 687 or alternative deployment environment identifier 687. The deployment status 688 could also be adjusted, as appropriate. Similarly, if a runtime machine-learning model 663 were no longer deployed in a particular deployment environment 681, the deployment status 688 could be similarly updated to reflect that the runtime machine-learning model 663 was no longer deployed.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in a distributed ledger that, when executed by the processor, cause the computing device to at least:
retrieve a runtime machine-learning model from an application record in a repository data store, the application record corresponding to an application that uses a machine-learning model;
calculate a runtime hash for the runtime machine-learning model;
concatenate the runtime hash with a source code hash to form a registration identifier;
provide the runtime hash and the registration identifier to a distributed agent as search criteria for the distributed agent to search the distributed ledger for a machine-learning model record;
evaluate a compliance status of the application record with a compliance rule based at least in part on a result of the search; and
send a request to the distributed agent to update the machine-learning model record in the distributed ledger based at least in part on whether the runtime machine-learning model at least meets a performance metric associated with the compliance status of the application record.

2. The system of claim 1, wherein the machine-readable instructions, when executed by the processor, further cause the computing device to at least:

obtain a machine-learning model record stored in the distributed ledger in response to the search; and confirm that the application record satisfies the compliance rule in response to obtaining the machine-learning model record.

3. The system of claim 1, wherein the machine-readable instructions, when executed by the processor, further cause the computing device to at least:

determine that the distributed ledger fails to contain a machine-learning model record with a matching runtime hash; and determine that the application record fails to satisfy the compliance rule in response to obtaining the machine-learning model record.

4. The system of claim 1, wherein the compliance rule specifies a minimum level of accuracy for the machine-learning model.

5. The system of claim 1, wherein the compliance rule specifies a maximum level of bias or variance for the machine-learning model.

6. The system of claim 1, wherein the machine-readable instructions, when executed by the processor, further cause the computing device to at least:

receive a registration request for a machine-learning model, the registration request comprising a model name for the machine-learning model, a version identifier for the machine-learning model, a network address from which the machine-learning model can be retrieved, the source code hash for a source code version of the machine learning model, and a runtime hash for a binary executable version of the machine-learning model;

create the registration identifier based at least in part on the source code hash and the runtime hash; and create an immutable entry in the distributed ledger for the machine-learning model, the immutable entry comprising the registration identifier, the model name, the version identifier, the network address, the source code hash, and the runtime hash.

7. The system of claim 6, wherein the machine-readable instructions, when executed by the processor, further cause the computing device to at least:

receive a rating for the machine-learning model and the registration identifier or runtime hash of the machine-learning model;

select the immutable entry in the distributed ledger for the machine-learning model based on the registration identifier or runtime hash; and update a score for the selected immutable entry in the distributed ledger for the machine-learning model based at least in part on the rating.

8. A computer-implemented method, comprising:

retrieving a runtime machine-learning model from an application record in a repository data store, the application record corresponding to an application that uses a machine-learning model;

calculating a runtime hash for the runtime machine-learning model;

concatenating the runtime hash with a source code hash to form a registration identifier;

providing the runtime hash and the registration identifier to a distributed agent as search criteria for the distributed agent to search a distributed ledger for a machine-learning model record;

evaluating a compliance status of the application record with a compliance rule based at least in part on a result of the search; and sending a request to the distributed agent to update the machine-learning model record in the distributed ledger based at least in part on whether the runtime machine-learning model at least meets a performance metric associated with the compliance status of the application record.

9. The computer-implemented method of claim 8, further comprising:

obtaining a machine-learning model record stored in the distributed ledger in response to the search; and confirming that the application record satisfies the compliance rule in response to obtaining the machine-learning model record.

10. The computer-implemented method of claim 9, further comprising:

determining that the distributed ledger fails to contain a machine-learning model record with a matching runtime hash; and determining that the application record fails to satisfy the compliance rule in response to obtaining the machine-learning model record.

11. The computer-implemented method of claim 8, wherein the compliance rule specifies a minimum level of accuracy for the machine-learning model.

12. The computer-implemented method of claim 8, wherein the compliance rule specifies a maximum level of bias or variance for the machine-learning model.

13. The computer-implemented method of claim 8, further comprising:

receiving a registration request for a machine-learning model, the registration request comprising a model name for the machine-learning model, a version identifier for the machine-learning model, a network address from which the machine-learning model can be retrieved, the source code hash for a source code version of the machine learning model, and a runtime hash for a binary executable version of the machine-learning model;

creating the registration identifier based at least in part on the source code hash and the runtime hash; and creating an immutable entry in the distributed ledger for the machine-learning model, the immutable entry comprising the registration identifier, the model name, the version identifier, the network address, the source code hash, and the runtime hash.

14. The computer-implemented method of claim 13, further comprising:

receiving a rating for the machine-learning model and the registration identifier or runtime hash of the machine-learning model;

selecting the immutable entry in the distributed ledger for the machine-learning model based on the registration identifier or runtime hash; and updating a score for the selected immutable entry in the distributed ledger for the machine-learning model based at least in part on the rating.

15. A non-transitory, computer-readable medium, comprising machine-readable instructions that, when executed by a processor of a computing device, cause the computing device to at least:

retrieve a runtime machine-learning model from an application record in a repository data store, the application record corresponding to an application that uses a machine-learning model;

calculate a runtime hash for the runtime machine-learning model;

concatenate the runtime hash with a source code hash to form a registration identifier;

provide the runtime hash and the registration identifier to a distributed agent as search criteria for the distributed agent to search a distributed ledger for a machine-learning model record;

evaluate a compliance status of the application record with a compliance rule based at least in part on a result of the search; and send a request to the distributed agent to update the machine-learning model record in the distributed ledger based at least in part on whether the runtime machine-learning model at least meets a performance metric associated with the compliance status of the application record.

16. The non-transitory, computer-readable medium of claim 15, wherein the machine-readable instructions, when executed by the processor, further cause the computing device to at least:

receive a registration request for a machine-learning model, the registration request comprising a model name for the machine-learning model, a version identifier for the machine-learning model, a network address from which the machine-learning model can be retrieved, the source code hash for a source code version of the machine learning model, and a runtime hash for a binary executable version of the machine-learning model;

create the registration identifier based at least in part on the source code hash and the runtime hash; and create an immutable entry in the distributed ledger for the machine-learning model, the immutable entry comprising the registration identifier, the model name, the version identifier, the network address, the source code hash, and the runtime hash.

17. The non-transitory, computer-readable medium of claim 15, wherein the machine-readable instructions, when executed by the processor, further cause the computing device to at least:

obtain a machine-learning model record stored in the distributed ledger in response to the search; and confirm that the application record satisfies the compliance rule in response to obtaining the machine-learning model record.

18. The non-transitory, computer-readable medium of claim 15, wherein the machine-readable instructions, when executed by the processor, further cause the computing device to at least:

determine that the distributed ledger fails to contain a machine-learning model record with a matching runtime hash; and determine that the application record fails to satisfy the compliance rule in response to obtaining the machine-learning model record.

19. The non-transitory, computer-readable medium of claim 15, wherein the compliance rule specifies a minimum level of accuracy for the machine-learning model.

20. The non-transitory, computer-readable medium of claim 15, wherein the compliance rule specifies a maximum level of bias or variance for the machine-learning model.

\* \* \* \* \*